(12) United States Patent
Alspaugh

(10) Patent No.: US 9,095,210 B1
(45) Date of Patent: Aug. 4, 2015

(54) ROTATING TRANSPORT CART

(75) Inventor: Brad Allan Alspaugh, Celina, OH (US)

(73) Assignee: V.H. Cooper & Company Inc., Fort Recovery, OH (US)

(*) Notice: Subject to any disclaimer, the term of this patent is extended or adjusted under 35 U.S.C. 154(b) by 485 days.

(21) Appl. No.: 13/445,090

(22) Filed: Apr. 12, 2012

(51) Int. Cl.
  *A47F 5/02* (2006.01)
  *A47B 49/00* (2006.01)
  *A47F 5/03* (2006.01)

(52) U.S. Cl.
  CPC .............. *A47B 49/002* (2013.01); *A47F 5/03* (2013.01)

(58) Field of Classification Search
  CPC ........... A47B 49/002; A47F 5/03; A47F 1/04; A47F 1/12; A47F 1/121
  USPC ................................ 211/164, 59.2
  See application file for complete search history.

(56) References Cited

U.S. PATENT DOCUMENTS

| | | | | |
|---|---|---|---|---|
| 988,297 | A * | 3/1911 | Barrow et al. | 312/36 |
| 1,097,273 | A * | 5/1914 | Tyler | 248/55 |
| 1,409,286 | A * | 3/1922 | Diner | 422/307 |
| 1,717,705 | A | 1/1926 | Hanney | |
| 2,054,875 | A | 4/1935 | Corey | |
| 2,589,598 | A * | 3/1952 | Belew | 312/305 |
| 2,720,993 | A | 10/1955 | Lull | |
| 2,752,056 | A | 6/1956 | Lull | |
| 2,763,383 | A | 9/1956 | McCoy | |
| 2,834,479 | A * | 5/1958 | Kayton | 211/164 |
| 2,946,407 | A | 7/1960 | Reich | |
| 3,038,614 | A | 6/1962 | Morley et al. | |
| 3,254,928 | A * | 6/1966 | Clatterbuck | 312/97.1 |
| 3,495,845 | A | 2/1970 | Jensen | |
| 3,620,363 | A * | 11/1971 | Donnithorne et al. | 220/524 |
| 3,784,024 | A * | 1/1974 | Kristy | 211/131.2 |
| 5,059,392 | A * | 10/1991 | Wijts | 422/32 |
| 5,368,423 | A * | 11/1994 | Hanna | 409/132 |
| 5,423,651 | A * | 6/1995 | Dinverno | 414/500 |
| 5,454,625 | A | 10/1995 | Christensen et al. | |
| 5,605,207 | A | 2/1997 | Betcher et al. | |
| 5,806,868 | A | 9/1998 | Collins | |
| 5,896,809 | A | 4/1999 | Miller | |
| 6,279,306 | B1 | 8/2001 | Langen | |
| 7,195,257 | B2 | 3/2007 | Stoneback et al. | |

(Continued)

OTHER PUBLICATIONS

"High Pressure Food Processing Systems," by Avure Technologies, Inc. Obtained from website http://www.avure.com/food/products/default.asp, printed Aug. 4, 2011, 1 page.

(Continued)

*Primary Examiner* — Korie H Chan
(74) *Attorney, Agent, or Firm* — James L. Young; Westman, Champlin & Koehler P.A.

(57) ABSTRACT

An apparatus for supporting a plurality of objects includes a frame and a drum rotatably attached to the frame so that the drum is rotatable about a horizontal axis. The drum has two ends. The drum includes a plurality of bays, each bay configured to receive one or more objects through an opening in an end of the drum, each bay comprising at least one support element positioned to prevent the one or more objects received within the respective bay from falling out of the respective bay as the drum rotates about the horizontal axis. A method of using a cart for supporting a plurality of objects includes inserting a first object into a first compartment at a first position; rotating the drum about a horizontal axis to move a second compartment to the first position; and inserting a second object into the second compartment.

14 Claims, 12 Drawing Sheets

(56) References Cited

U.S. PATENT DOCUMENTS

| | | | |
|---|---|---|---|
| 7,588,407 | B2 | 9/2009 | Cook |
| 7,896,603 | B2 | 3/2011 | Cook |
| 2009/0191033 | A1 | 7/2009 | Cook |
| 2009/0245991 | A1 | 10/2009 | Cook |
| 2009/0297306 | A1 | 12/2009 | Cook |

OTHER PUBLICATIONS

"High Pressure Processing of Food," by Avure Technologies, Inc. Obtained from website http://www.avure.com/food/applications/?__kk=high-pressure%20pasteurization&__kt=d3d36afb-72db-4e8b-96fe-ea1508082c41&gclid=CPyu3Lus7akCFRHGKgodqzzPZg, printed Jun. 21, 2012, 1 page.

Rory Harrington, "'Game changing' high pressure processing system launched," obtained from website http://www.foodproductiondaily.com/content/view/print/278761, dated Feb. 22, 2010, printed Jun. 21, 2012, 1 page.

"History," by CHIC FresherTech, obtained from website http://www.chicfreshertech.com/about.php, copyright 2010, printed Aug. 4, 2011, 1 page.

"What is HPP?," by CHIC FresherTech, obtained from website http://www.chicfreshertech.com/hpp.php, copyright 2010, printed Aug. 4, 2011, 1 page.

Photograph of cart by Gridpath Solutions of Canada, taken on Feb. 14, 2011, 1 page.

\* cited by examiner

ROTATING TRANSPORT CART

BACKGROUND

High Pressure Pasteurization or High Pressure Processing (HPP) is a post-packaging treatment that eradicates food pathogens and spoilage organisms in food products. This process is also known as high hydrostatic processing (HHP) and ultra-high pressure processing (UHP). The key food sectors for HPP are ready-to-eat, whole muscle and sliced meats; seafood; fresh-cut fruit, juices, and smoothies; as well as deli salads, condiments, dips, soups, salsas, and sauces. Currently, premium salads such as pastas with protein that are made without preservatives have an average shelf-life of just four to eight days. HPP treatment can extend the shelf-life to thirty to fifty days while producing a product with a clean label for which consumers are willing to pay a premium price.

Pressure inactivates most vegetative bacteria at pressures above 60,000 pounds per square inch (psi). During HPP, foods are subjected to isostatic or hydrostatic pressure, which is equal from all directions, at levels up to 100,000 psi. This high pressure destroys pathogenic microorganisms by interrupting their cellular function. Within a living bacteria cell, many pressure sensitive processes such as protein functions, enzyme action and cellular membrane function are affected by high pressure with the result that the bacteria is unable to survive. In contrast, macromolecules in food that are responsible for flavor, order, and nutrition are typically not changed by pressure. HPP can be conducted at ambient or refrigerated temperatures, thereby eliminating thermally-induced off-flavors. The technology is especially beneficial for heat-sensitive products.

HPP is gaining in popularity within the food industry because of its ability to inactivate pathogenic microorganisms with minimal to no heat treatment, resulting in nearly complete retention of the nutritional and sensory characteristics of fresh food. Unique advantages of HPP include the following, for example: pressure transmission is instantaneous and uniform, is not controlled by product size, and is effective throughout the entirely of the food item. Other advantages of HPP over traditional thermal processing include reduced process time; minimal heat damage problems; retention of freshness, flavor, texture, color and nutrients; and reduction or elimination of the need for preservatives such as sodium.

In a typical HPP process, the product is packaged in a flexible container (usually a pouch or plastic bottle) and is loaded into a high pressure chamber filled with a pressure-transmitting (hydraulic) fluid. The hydraulic fluid (normally water) in the chamber is pressurized with a pump, and this pressure is transmitted through the package and into the food itself. Pressure is applied for a specific time, usually three to five minutes. The processed product is then removed and stored or distributed in a conventional manner. Because the pressure is transmitted uniformly (in all directions simultaneously), foods retains its shape, even at extreme pressures. HPP can be used to process both liquid and solid foods. The food to be processed must contain water and must not have internal air pockets. Food materials containing entrapped air such as strawberries or marshmallows would be crushed under high-pressure treatment, and dry solids do not have sufficient moisture to make HPP effective for bacterial destruction.

In general, HPP can provide a shelf-life similar to thermal pasteurization. For foods where thermal pasteurization is not an option—due to flavor, texture or color changes—HPP can extend the shelf-life many times compared to a non-pasteurized counterpart, thereby improving food safety. High pressure has very little effect on low molecular weight compounds such as flavor compounds, vitamins, and pigments compared to thermal processes. Accordingly, the quality of HPP pasteurized food is very similar to that of fresh food products and any quality degradation is typically influenced more by subsequent storage and distribution rather than the pressure treatment itself. Pressure also provides a unique opportunity to create and control novel food textures in protein-based or starch-based foods. In some cases, pressure can be used to form protein gels and increase viscosity without losing heat.

Prior to processing, packaged foods are typically loaded into a vessel such as carrier 10 shown in FIG. 1. A typical carrier has a diameter of about 14.5 inches and length of about 35.0 inches. A typical carrier 10 includes top openings 12 through which the packaged food products may be inserted into and removed from carrier 10. Packed food products may also be inserted and removed through either of removable ends 14. Ends 14 typically include a plurality of ports 16 through which water may enter and exit carrier 10. Moreover, an end 14 may include a direction indicator such as an arrow-shaped port 18, which assists an operator in proper orientation of the carrier 10 during processing so that the packaged food items do not fall out of openings 12 due to gravity. A single fully loaded carrier 10 can weigh up to about three hundred pounds. Carrier 10 can accommodate variously shaped packages, including bottles, cups and shrink-wrapped packages.

Because a filled HPP carrier 10 is very heavy, loading and unloading many filled HPP carriers into a high pressure pasteurization machine is a physically demanding job. Moreover, HPP carriers must be handled carefully, as scratches may compromise the strength of carriers and their ability to withstand the pressurization process. Thus, there is a need for an apparatus to assist an operator in moving loaded HPP carriers while protecting the carriers from potential damage.

SUMMARY

In one aspect, an apparatus for supporting a plurality of objects is disclosed. The apparatus comprises a frame and a drum rotatably attached to the frame so that the drum is rotatable about a horizontal axis. The drum has two ends spaced axially apart. The drum comprises a plurality of bays, each bay configured to receive one or more objects through an opening in an end of the drum, each bay comprising at least one support element. The at least one support element of each bay is positioned to prevent the one or more objects received within the respective bay from falling out of the respective bay as the drum rotates about the horizontal axis.

In another aspect, a method of using a cart for supporting a plurality of objects is disclosed. The method comprises inserting a first object into a first compartment through a first opening in an end of a drum, the first compartment being at a first position; rotating the drum about a horizontal axis to move a second compartment to the first position; and inserting a second object into the second compartment through a second opening in the end of the drum.

In another aspect, an apparatus for supporting a plurality of objects is disclosed that comprises a frame, a body attached to the frame and having two spaced-apart ends, and a plurality of compartments disposed within the body. Each compartment is configured to receive one or more objects through an opening in an end of the body. The plurality of compartments are movable with respect to the frame so that each of the compartments is movable to and from a designated position.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION

Figure 1:
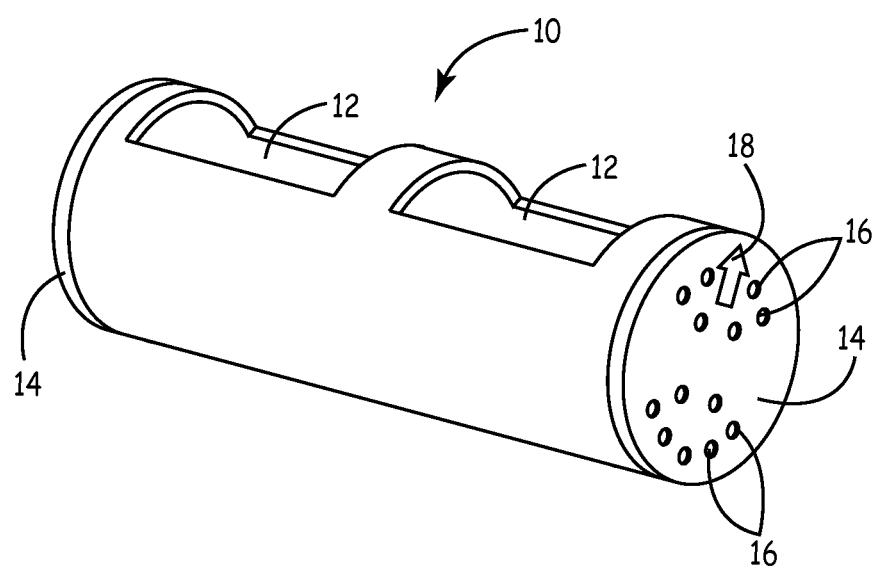
FIG. 1 is a perspective view of a typical prior art HPP carrier.
Figure 2:
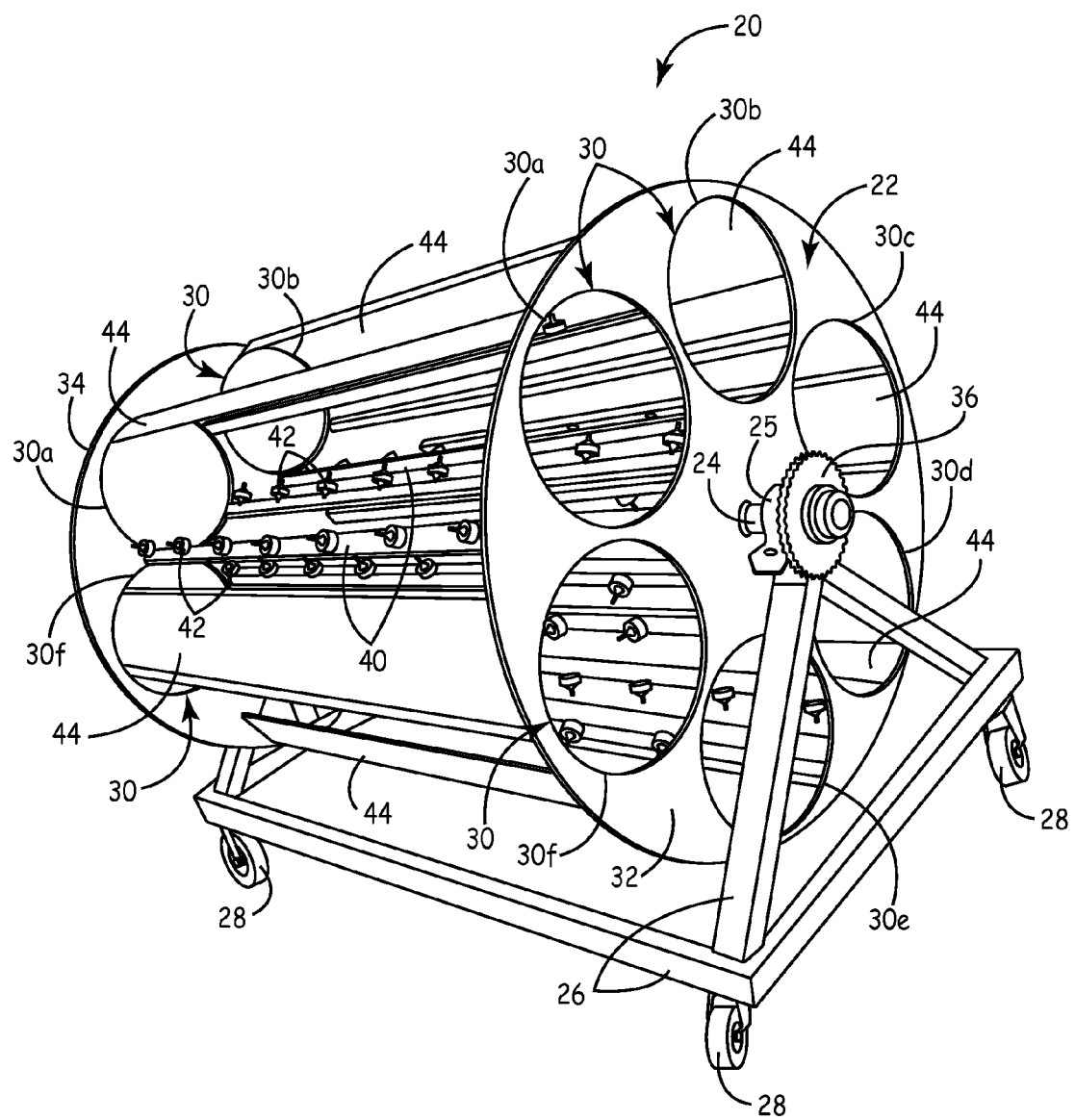
FIG. 2 is a perspective view of an exemplary rotating transport cart from the rear, with the rotating mechanisms removed.

FIG. 2 shows an exemplary revolving cart 20 for the transport of multiple HPP carriers 10 (shown in FIGS. 1 and 4-10). Cart 20 has a body which in one embodiment is a generally cylindrical drum 22 with a longitudinal axial shaft 24 rotatably mounted via bearings 25 upon frame 26. Longitudinal axial shaft is fixed to cylindrical drum 22 so that turning longitudinal axial shaft 22 results in rotation of cylindrical drum 22. In an exemplary embodiment, frame 26 is mounted upon mobility elements such as casters 28 for mobility along a ground surface. Drum 22 has two ends spaced axially apart, defined by rear end plate 32 and front end plate 34, which are substantially perpendicular to longitudinal axial shaft 24. A plurality of corresponding openings 30 (referenced as 30a, 30b, 30d, 30d, 30e, and 30f, for example) in rear end plate 32 and front end plate 34 allow for the insertion and removal of a plurality of HPP carriers 10 into and out of cart 20. Rotating mechanisms are attached to sprocket 36 to rotate drum 22 about a horizontal axis defined by longitudinal axial shaft 24. These rotating mechanisms are removed in FIG. 2 for clarity of illustration, but are shown and discussed with reference to FIGS. 7a, 7b and 7c.

Figure 3:
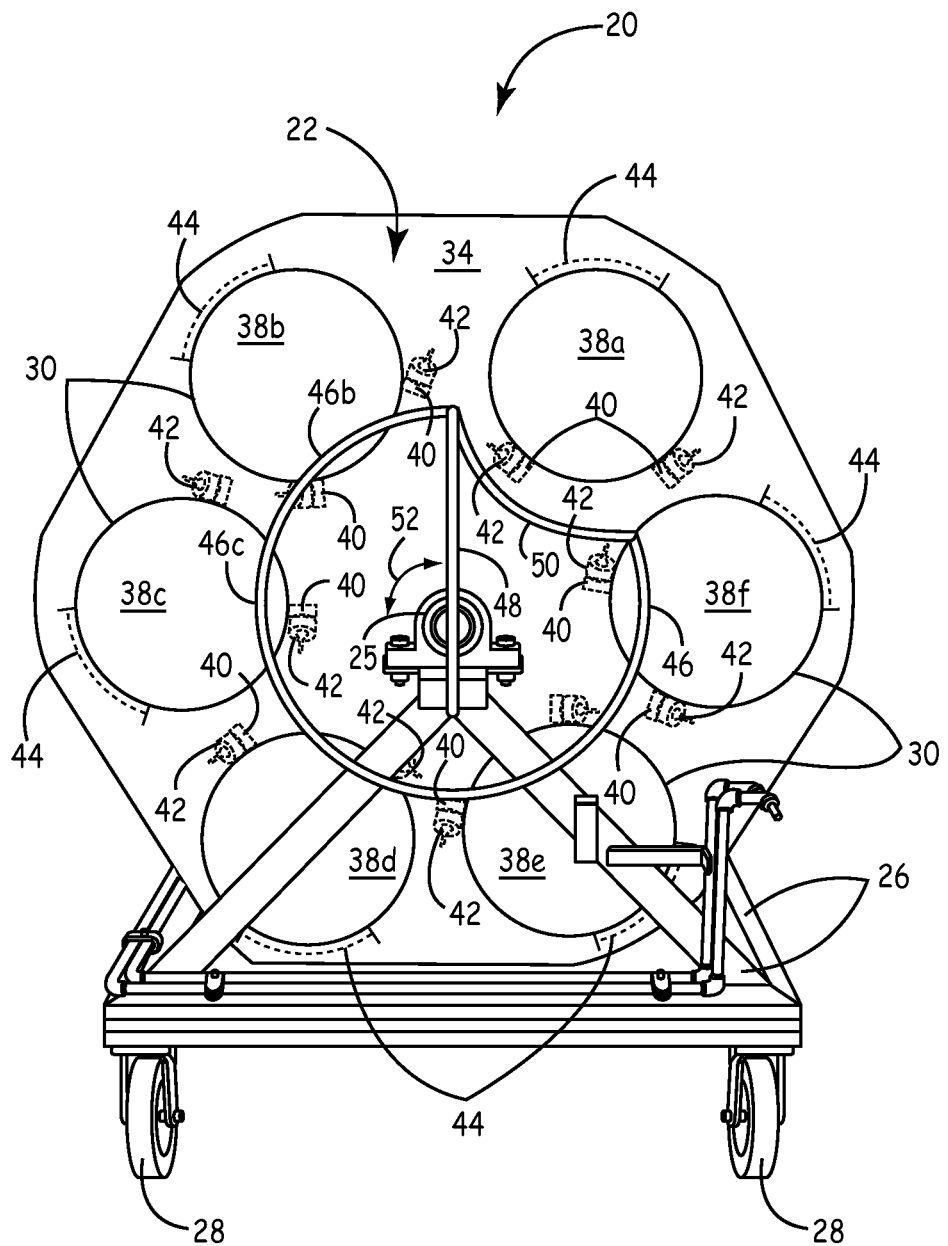
FIG. 3 is a front end view of the cart of FIG. 2.

As shown in FIGS. 3-6, each longitudinal channel between corresponding openings 30 in rear end plate 32 and front end plate 34 forms a compartment or bay 38 for the receipt of two HPP carriers 10 in an exemplary embodiment. In an exemplary embodiment, each of the openings 30 is circular, and so each bay 38 is a cylindrical space between corresponding openings 30 in each of rear end plate 32 and front end plate 34 of drum 22 (i.e., between corresponding openings 30a, 30a). FIG. 3 shows rotating cart 20 from a front end. Each bay 38 has two roller guides 40 supporting a plurality of rollers 42 to support a bottom surface of carriers 10 and to reduce friction as carriers 10 are moved from one end of bay 38 to the other end. For each bay 38, the roller guides 40 are spaced apart and the rollers 42 are angled so that the rolling surfaces of rollers 42 are substantially tangent to the cylindrical space of the bay 38. Accordingly, the rolling surfaces of rollers 42 contact an inserted carrier 10 substantially parallel to the outer surface of the carrier 10. In an exemplary embodiment, as shown in FIG. 2, each roller guide 40 is a longitudinal element extending from rear end plate 32 to front end plate 34. Each roller guide 40 has mounted thereon a plurality of rollers 42 evenly spaced along the corresponding roller guide 40. In an exemplary embodiment, each roller guide is about 72.0 inches long and supports a plurality of rollers, each of which has a diameter of about 2.0 inches. In an exemplary embodiment, each opening 30 is about 15.0 inches in diameter and the roller guides 40 for a bay 38 are spaced about 12.0 inches apart.

Figure 5:
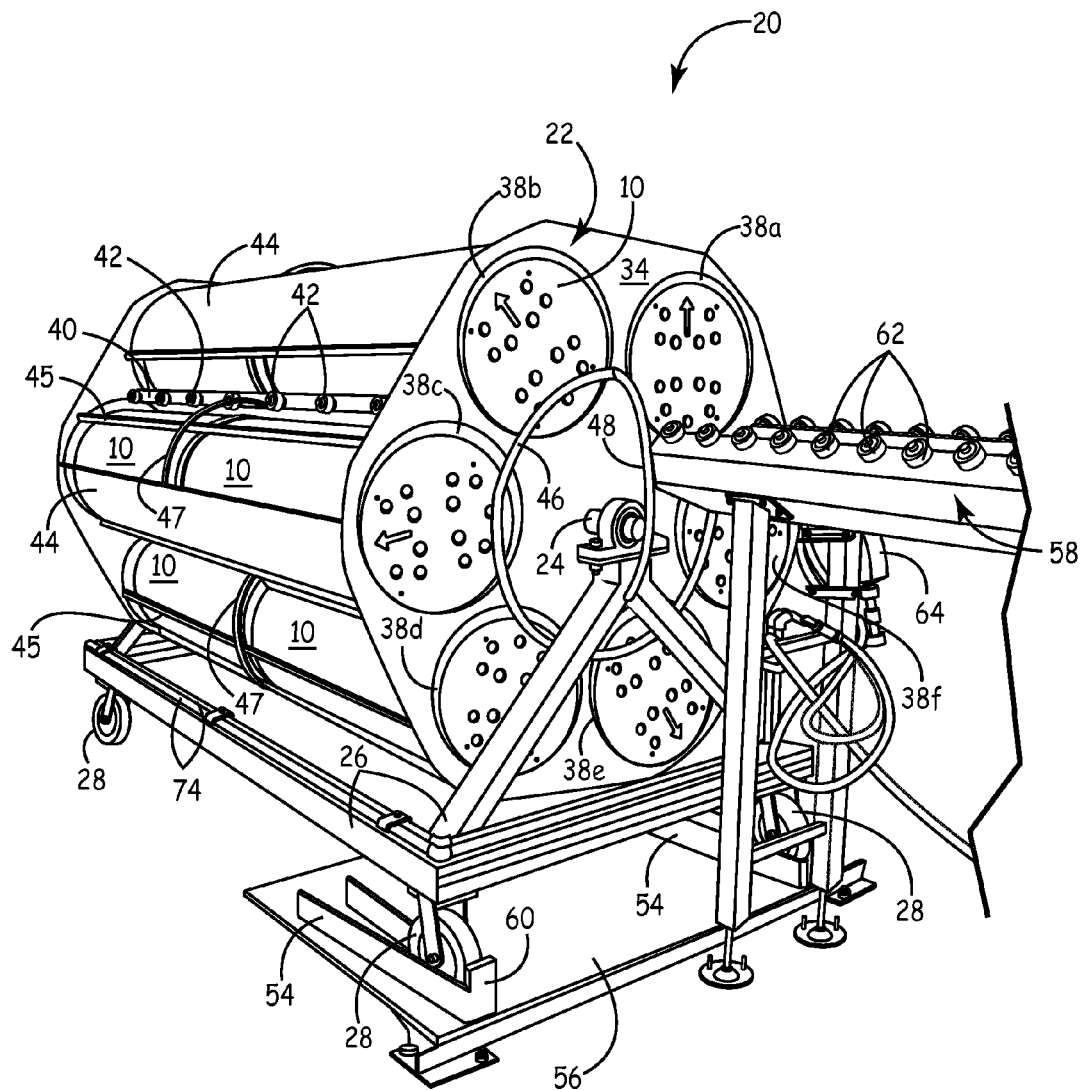
FIG. 5 is perspective view of the cart from the left and front, loaded with carriers, and positioned against a conveyor.

As shown in FIG. 3, each bay 38 also has a shield 44 positioned opposite the roller guides 40 for covering the top openings 12 of an HPP carrier 10. Therefore, the contents of the HPP carrier will not fall out of the carrier 10 while it is rotated about longitudinal axial shaft 24. In an exemplary embodiment, each shield 44 extends a length of bay 38 from rear end plate 32 to front end plate 34 and has a width of about 10.0 inches. In an exemplary embodiment, each shield 44 is formed from an elongated, curved sheet of metal having flanges on the long sides thereof for increased strength. The curve of shield 44 follows the curve of a portion of opening 30. As shown in FIG. 5, other support elements that prevent carriers 10 from falling out a side of bay 38 during rotation include rods 45, which are attached to rear end plate 32, front end plate 34, and arcs 47 (rods 45 and arcs 47 are not shown in FIG. 2 so that the rollers guides 40 and rollers 42 can be seen more clearly). While shield 44 in an alternative embodiment could completely enclose bay 38, the illustrated partial shield embodiment offers advantages of lower weight, lower materials cost, and an immediate visual indication of the presence of carrier(s) 10 within a bay 38. The relatively open cart 20, as shown in FIG. 2, also allows for ease in maintenance and cleaning, as parts can be seen and reached easily. It is contemplated that support elements such as roller guides 40, shield 44, rods 45 and arcs 47 can be sized and shaped differently than described depending on the objects to be loaded onto and retained within cart 20. Other suitable supporting elements include a screen or a series of parallel rods, for example.

Figure 4:
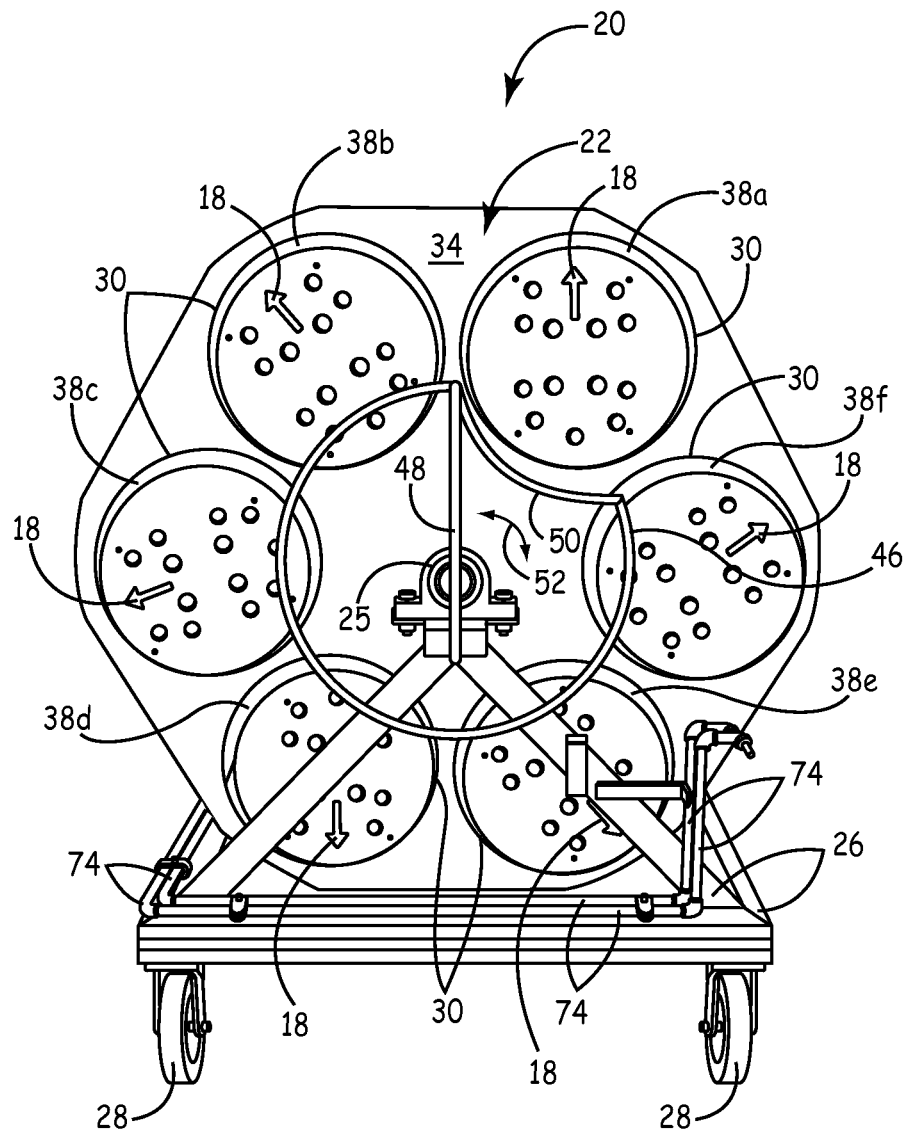
FIG. 4 is a front end view of the cart of FIG. 3, loaded with a plurality of HPP carriers.

In an exemplary embodiment, a guard 46 having a handle 48 is mounted upon frame 26 of cart 20. As shown in FIG. 4, guard 46 is substantially circular except for a concave portion 50 proximate the bay at bay position 38a. Guard 46 thus has arcuate segments (such as, e.g., segments 46b, 46c, etc.) that prevent the carriers 10 in the other bay positions 38b through 38f from coming out of cart 20 by obstructing their respective openings 30b-30f. Thus, only the carriers 10 in the unobstructed bay position 38a can be loaded or unloaded from the front of cart 20 at any particular time, through opening 30a. FIG. 4 shows cart 20 fully loaded with a plurality of carriers 10, with arrow-shaped port 18 of each carrier 10 showing the orientation of the carrier within each of the bay positions 38a through 38f. In an exemplary embodiment, transport cart 20 has six bays 38a through 38f arranged equidistantly in a circular configuration around longitudinal axial shaft 24. The carriers 10 loaded in the bay at position 38a are oriented vertically so that arrow-shaped port 18 points upward, and openings 12 are at the top of carrier 10. In an exemplary embodiment, cart 20 is sized so that each bay 38 is long enough to accommodate two carriers 10, placed end-to-end. The carriers 10 in adjacent bays 38 are offset sixty degrees from each other, as shown in FIG. 4. This is a accomplished by loading the bay in position 38a with the openings 12 and arrow 18 upward, as shown, and then rotating drum 22 of cart 20 in either rotation direction 52 about longitudinal axial shaft 24.

As shown in FIG. 3, each of the sets of roller guides 40 and shield 44 of a particular bay 38 is offset sixty degrees from that of its neighboring bay 38 to support the HPP carriers 10 and their contents in each of the rotary orientations. The exemplary sixty-degree offset is appropriate for the use of six carriers evenly spaced about a three hundred and sixty degree circular drum end. However, it is to be understood that other angular offsets may be used when more or fewer bays 38 are used, or if their spacing or configuration is different from that shown. For example, in the illustrated embodiment, the plurality of bays 38 are movable with respect to the frame 26 so that each of the bays 38 is movable to and from a designated bay position 38a using a rotary mechanism. However, other bay movement mechanisms may also be used, such as belts, pulleys, and other conveyors.

Figure 6:
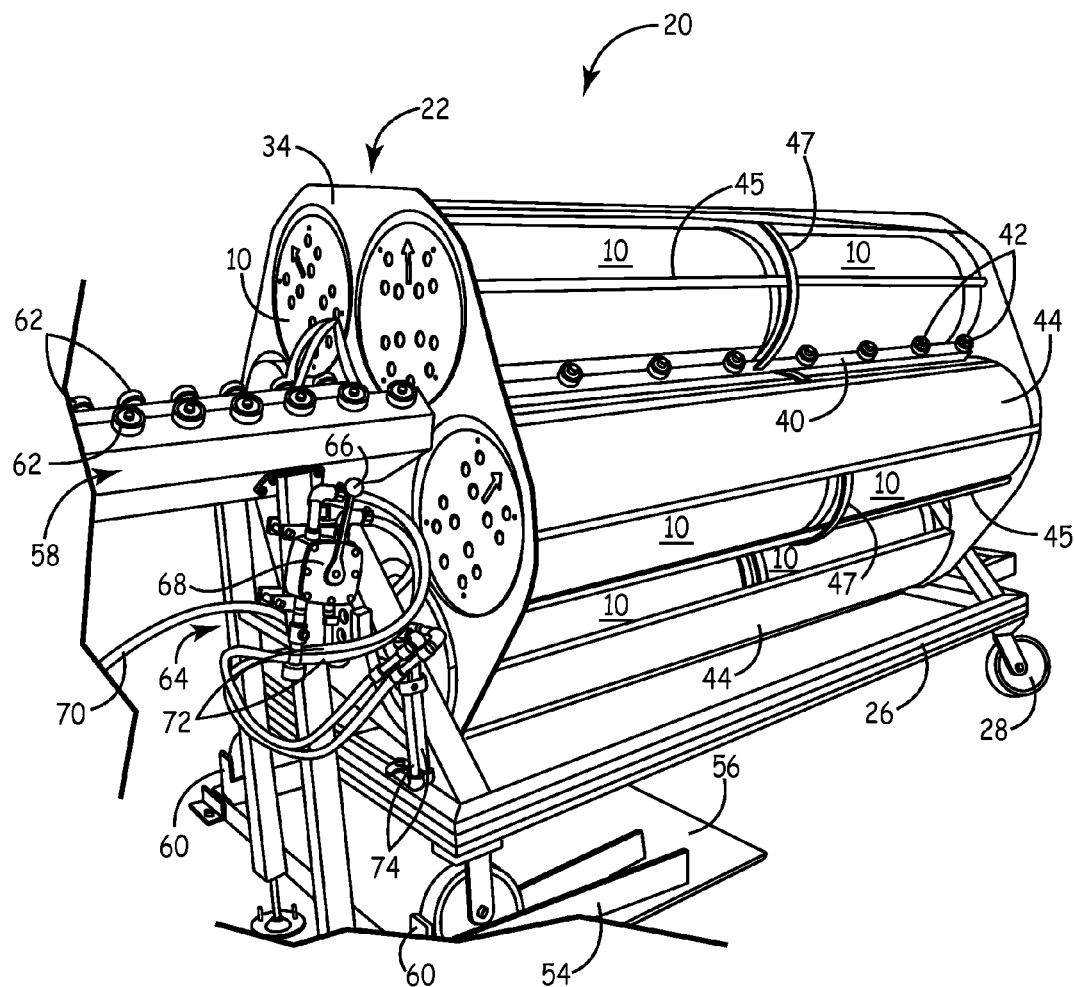
FIG. 6 is a perspective view of a loaded cart, as positioned proximate a conveyor, viewed from the right and front.

Cart 20 is typically positioned against a conveyor 58, as shown in FIGS. 5 and 6, for loading and unloading of carriers 10. Conveyor 58 of FIG. 5 is shown at a fixed location, and floor guide 56 is used to position cart 20 relative to conveyor 58. It is common for a conveyor to be in a fixed location where conveyor 58 is an infeed conveyor for an HPP processing machine; carriers 10 of cart 20 will typically be full and are unloaded from cart 20 at such a location. In other applications, such as where a conveyor is used in loading cart 20, the conveyor may be located on a mobile table. In such cases, a coupling mechanism can be used to attach the cart 20 and the conveyor to each other for the loading operation to maintain alignment of the openings 30 with respect to the conveyor. The conveyor 58 depicted in FIGS. 5 and 6 will be used in discussions of both the loading of carriers 10 into cart 20 and the unloading of carriers from cart 20, although it is to be understood that such loading and unloading will in fact typically occur at different conveyors.

FIG. 5 shows front casters 28 of cart 20 positioned within guide tracks 54 of floor guide 56, which assists an operator in accurately placing cart 20 so that the carriers 10 thereon can be easily moved onto conveyor 58. In an exemplary embodiment, floor guide 56 is secured to a floor surface proximate conveyor 58. Each guide track 54 includes wheel stop 60 so that when front casters 28 contact wheel stops 60, rotating cart 20 is correctly positioned so that an HPP carrier 10 in the bay at position 38a can be pulled out of the rotating cart 20 and slid onto the guide rollers 62 of conveyor 58. Once cart 20 is in position, rotational power control system 64 is operably attached to cart 20 to controllably rotate drum 22 about longitudinal axial shaft 24.

As shown in FIG. 6, in an exemplary embodiment, rotational power control system 64 is attached to pneumatic rotational mechanisms. However, other forms of rotational power can be used such as electrical, hydraulic and an operator's manual power, for example. In an exemplary embodiment, rotational power control system 64 includes a control joystick 66 mounted on a control box 68, which is in turn connected by suitable tube 70 to a compressed air source (not shown) and tubes 72 and to pipes 74 on frame 26. The pneumatic connections described in this disclosure use conventional pneumatic tubes and valves. In an exemplary embodiment, drum 22 of cart 20 does not move when control joystick 66 is in the vertical position shown, and joystick 66 is movable in first and second opposite directions from that vertical position. Moving joystick 66 in the first direction causes drum 22 to rotate in one direction; moving joystick 66 in the second direction causes drum 22 to rotate in the opposite direction.

Figure 7A:
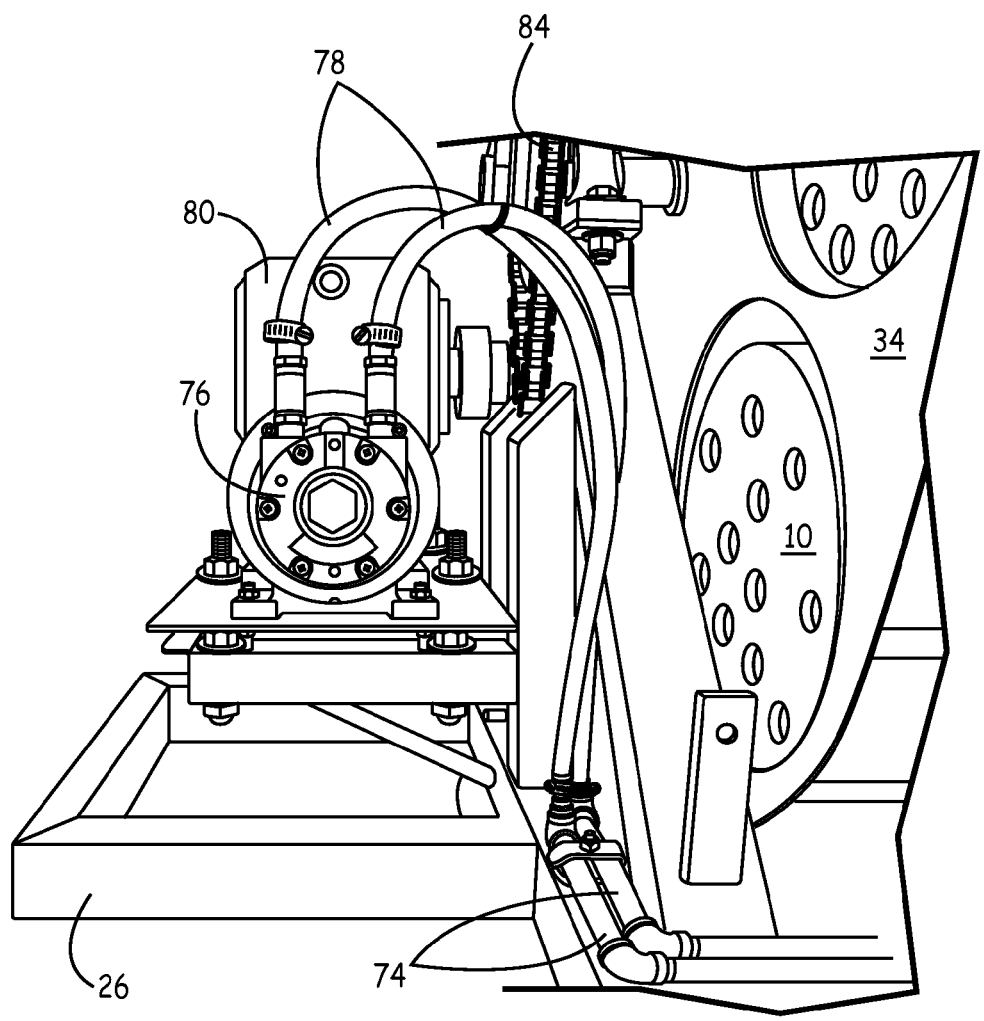
FIG. 7a is a left side view of the rotating mechanisms at the rear of the cart.
Figure 7B:
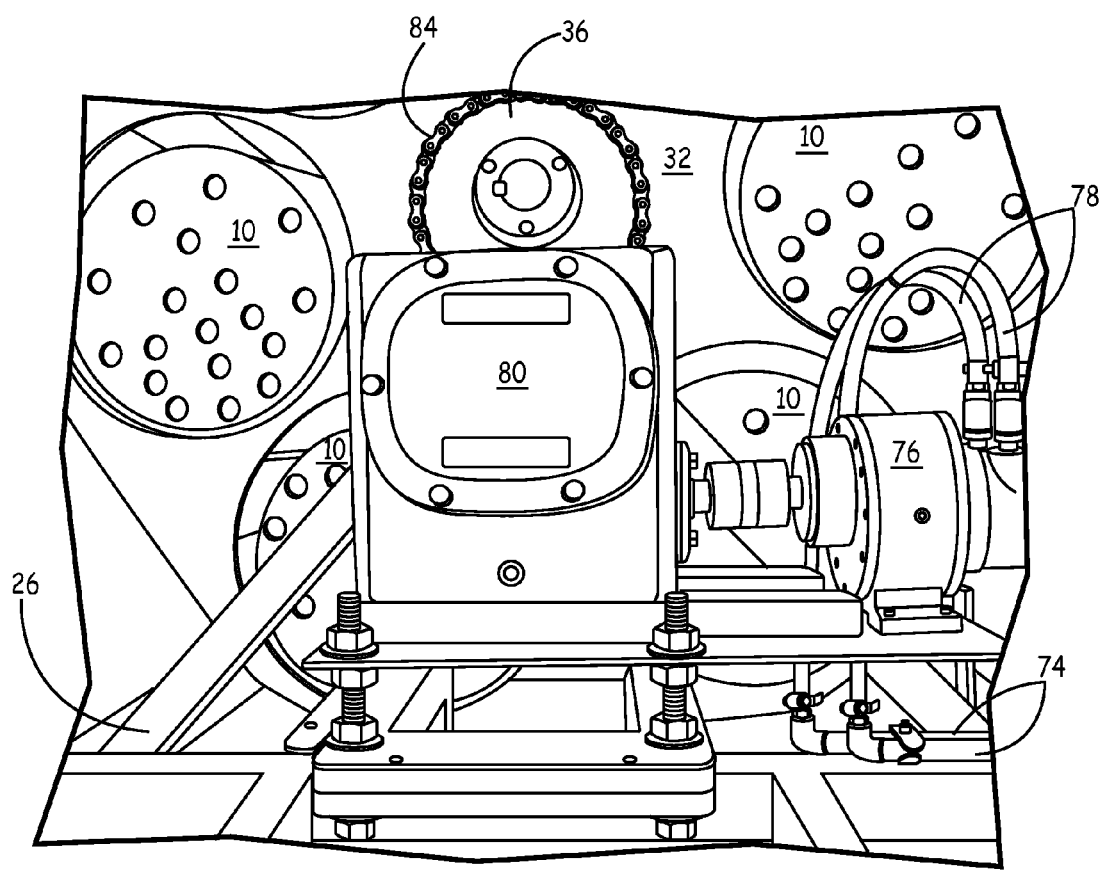
FIG. 7b is a view of the rotating mechanisms at the rear of the cart, as viewed from the back.

Pipes 74 wrap around a left side of frame 26 and connect to air motor 76 with tubing 78, as shown in FIG. 7a. A geared air motor 76 is in turn connected to gearbox 80, which contains a helical worm gear for the drive system to rotate drum 22 of cart 20, as shown in FIGS. 7a and 7b. A drive shaft 82 of gearbox 80 is connected to a sprocket that, in turn is engaged by roller chain 84 that also engages sprocket 36 that is fixedly connected to longitudinal axial shaft 24, to thereby drive sprocket 36 and rotate drum 22. The use of air motor 76 along with the helical worm gear of gearbox 80 allows for accurate speed regulation of the rotation of drum 22 while eliminating any need for electricity. In an exemplary embodiment, gear box 80 has an inherent locking capability; when rotation of drum 22 has stopped, the worm gear prevents longitudinal axial shaft 24 from turning. This is especially helpful during times when the load in cart 20 is unbalanced (e.g., full HPP carriers in bay positions 38e and 38f when bay positions 38a-38d are empty). A conventional gearbox without such a locking capability would spin in the direction of the load, thereby causing drum 22 to rotate out of the desired position (i.e., for loading or unloading). The exemplary drive system allows for a minimum torque of six hundred to eight hundred foot pounds. Gear reduction on the gear box and with the sprocket is set up for a maximum of two to three rotations per minute. The weight of an empty cart 20 is approximately four hundred pounds.

Figure 7C:
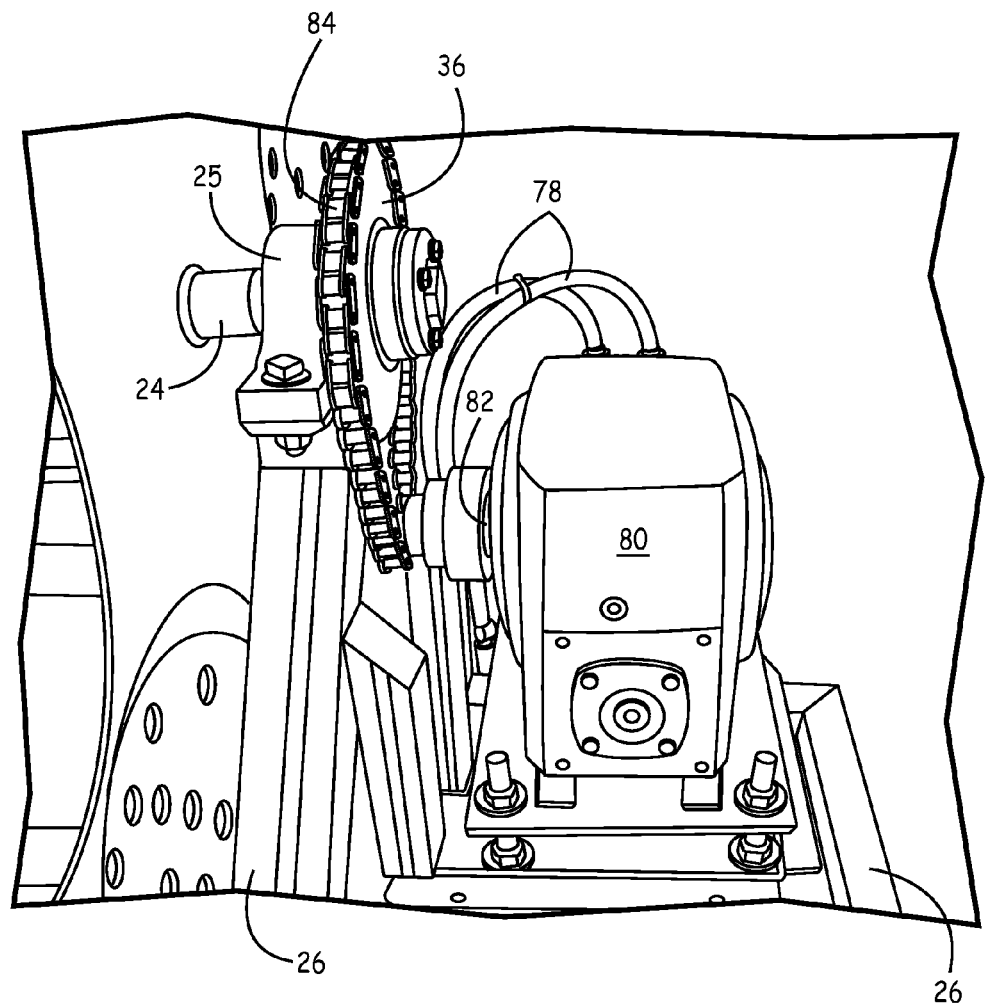
FIG. 7c is a view of the rotating mechanisms at the back of the cart, as viewed from the right side.
Figure 8:
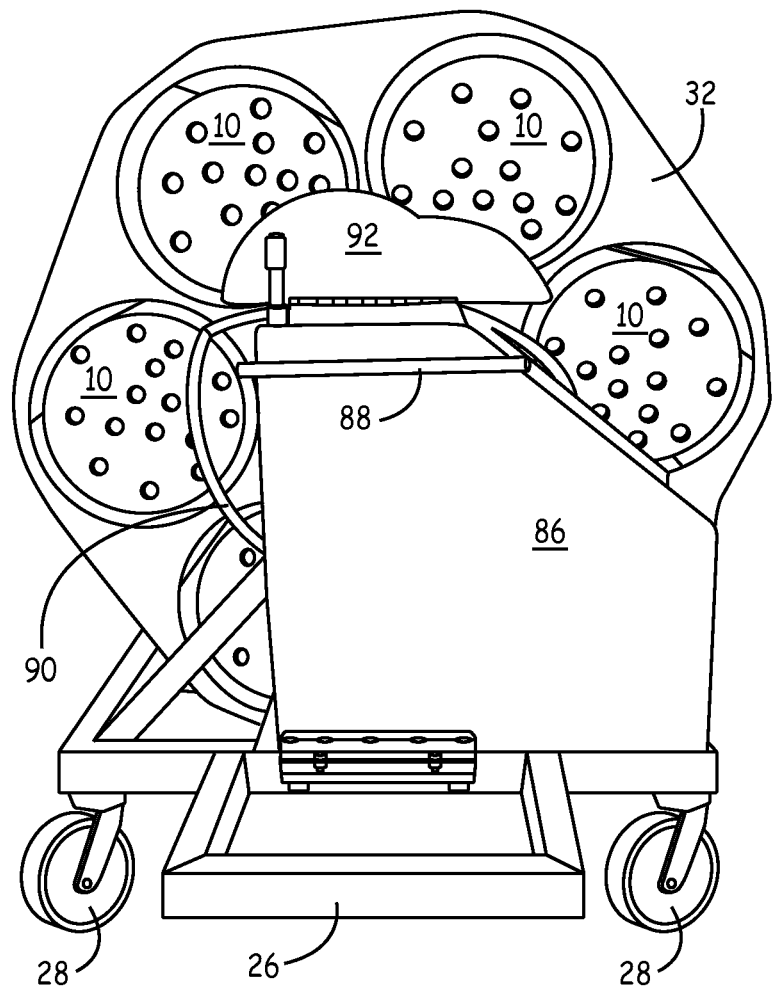
FIG. 8 is a view of the rear of the cart, showing a housing that covers and protects the rotating mechanisms shown in FIGS. 7a, 7b, and 7c.
Figure 9:
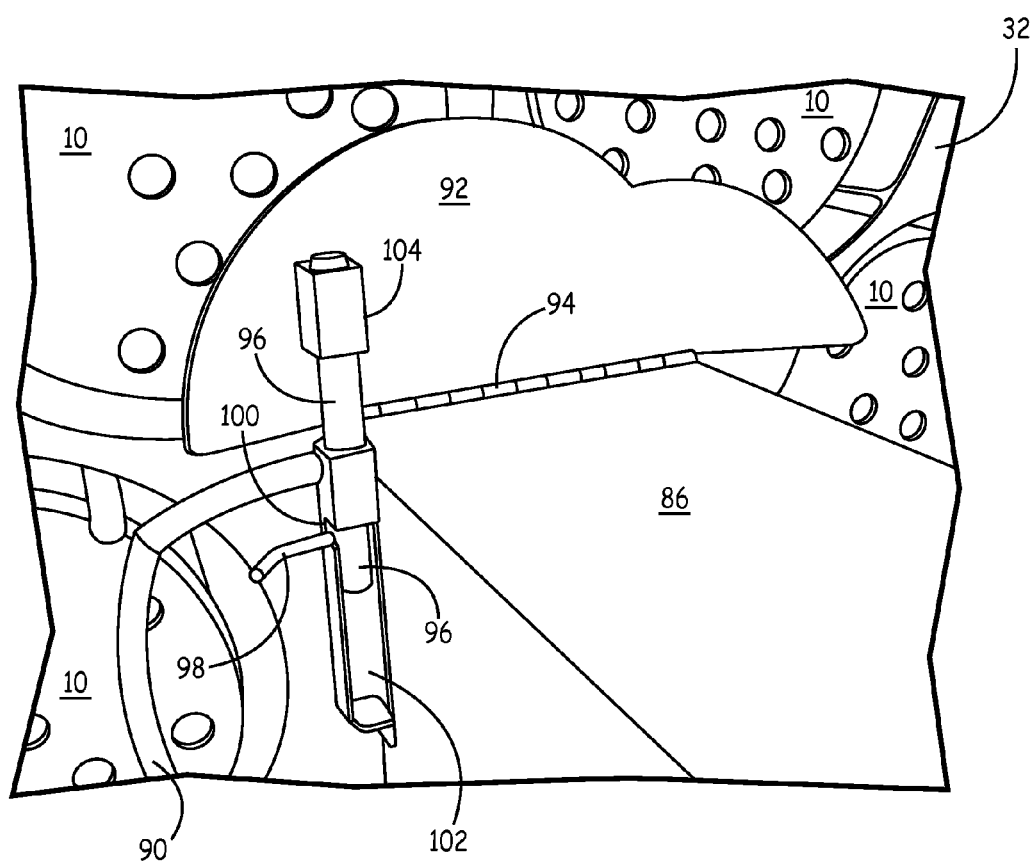
FIG. 9 is a close-up perspective view of a hinged panel of the rear housing in a vertical position.
Figure 10:
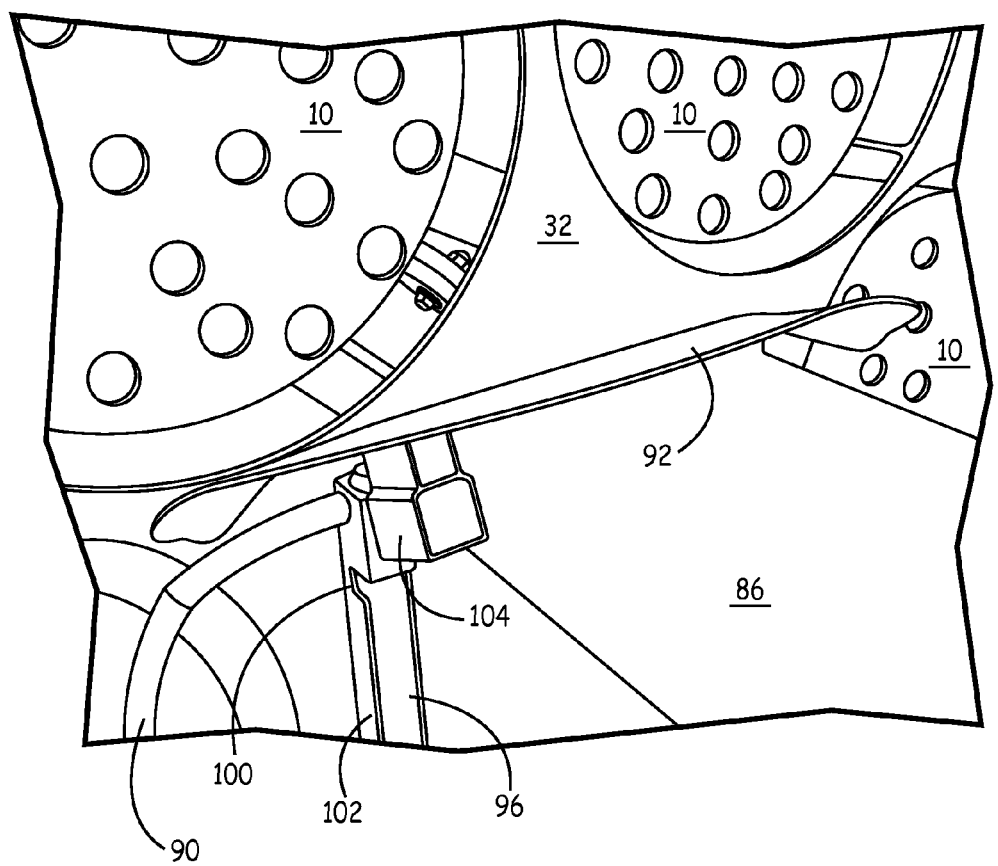
FIG. 10 is similar to FIG. 9, but shows the hinged panel being pivoted downward.

FIGS. 8 through 10 show a housing 86 mounted to frame 26, with housing 86 shaped to cover and protect air motor 76, gear box 80, sprocket 36, and attached components of FIGS. 7a through 7c that make up the pneumatic rotational mechanism. In an exemplary embodiment, housing 86 includes handle 88 for ease of maneuvering cart 20 from the rear of the cart. In an exemplary embodiment, housing 86 includes a guard 90 to prevent carriers 10 in the lower bays 38 from falling out of a rear end of cart 20 by obstructing the openings 30 of those lower bays 38. In an exemplary embodiment, housing 86 includes a movable panel 92, which selectively obstructs a rear end of upper bays 38 and can be moved to allow carriers 10 in those upper bays 38 to be inserted and removed from a rear end of cart 20. This is especially useful for inserting and removing empty carriers 10, which will be relatively lightweight and therefore not require direct transfer onto a support surface such as a conveyor. As illustrated, access to two upper bays 38 is provided simultaneously, thereby allowing access to all six bays of cart 20 with only two additional actuations of rotational power control system 64.

As shown in FIG. 9, the illustrated panel 92 is attached at hinge 94 to housing 86. Rod 96 is secured in a raised position by the insertion of lever 98 into notch 100 of channel 102. Thus, an upper end of rod 96 is positioned within guide 104 on panel 92 to retain panel 92 in a raised position against rear end plate 32 of cart 20. To lower panel 92, as shown in FIG. 10, lever 98 is turned to release from notch 100, thereby allowing rod 96 to lower into channel 102, so that its top end does not obstruct the folding down motion of panel 92.

Cart 20 can be used in an HPP operation as follows: an operator maneuvers an empty cart 20, as shown in FIG. 3, by pushing and/or pulling on handle 48 on a front of cart 20 and/or handle 88 on a rear of cart 20 to move cart 20 upon a ground surface via casters 28. Alternatively, a motorized material handling vehicle may be used to push or pull cart 20 by attaching to frame 26. The operator positions an empty cart 20 against a conveyor 58, such as that shown in FIGS. 5 and 6. The operator hooks up tube 70 to a compressed air source and tubes 72 to pipes 74 on frame 26 of cart 20. The operator pushes or pulls on joystick 66 to rotate cart 20 so that a bay 38 lines up with bay position 38a and is therefore in position to receive carriers 10 from conveyor 58. The operator slides one or more carriers 10 from conveyor 58 into the bay at position 38a. The operator pushes or pulls on joystick 66 to further rotate cart 20 so that the filled bay 38 rotates out of bay position 38a and an empty bay 38 lines up with bay position 38a and is therefore in position to receive additional carriers 10 from conveyor 58. The operator repeats the steps of filling empty bays and rotating drum 22 until all the bays are filled as desired. The operator then unhooks tubes 72 and moves the loaded cart 20 to an unloading location, which includes a conveyor also like conveyor 58 of FIGS. 5 and 6.

The operator positions the filled cart 20 against an infeed conveyor, such as that shown in FIGS. 5 and 6. The operator hooks up tube 70 to a compressed air source—if tube 70 is not already connected to a compressed air source—and hooks up tubes 72 to pipes 74 on frame 26 of cart 20. The operator pushes or pulls on joystick 66 to rotate cart 20 so that a bay 38 lines up with bay position 38a. The operator removes carriers 10 from cart 20 by sliding one or more carriers 10 out of the bay at position 38a and onto the conveyor. The operator pushes or pulls on joystick 66 to further rotate cart 20 so that the empty bay rotates out of bay position 38a and a loaded bay 38 lines up with bay position 38a. The operator repeats the steps of emptying loaded bays and rotating drum 22 until the cart has been emptied. The operator then unhooks tubes 70 and 72 and moves the empty cart 20 to a desired location.

In the illustrated embodiment, cart 20 allows up to twelve HPP carriers 10 to be moved from one location in an HPP processing facility to another. Even though each of these carriers 10 weighs about three hundred pounds when filled, the roller guides 40 and rollers 42 allow them to be easily slid in and out of cart 20 without operator fatigue. The horizontal movement of carriers 10 in and out of cart 20, directly to and from another support surface such as a conveyor, virtually eliminates any danger of the carriers falling during loading and unloading. Moreover, because of the rotating capability of cart 20, each of the carriers 10 can be moved to the correct height for loading and unloading without requiring manual lifting by the operator. Additionally, a fully loaded cart 20 has a relatively low center of gravity because all of the carriers 10 are positioned at the loading/unloading height or lower; thus, the cart 20 is stable and easy to maneuver. The compact design of cart 20 allows a single operator to move about 3,600 pounds of food products to be processed while substantially eliminating risk of injury to the operator or damage to the carriers 10.

Although the subject of this disclosure has been described with reference to several embodiments, workers skilled in the art will recognize that changes may be made in form and detail without departing from the spirit and scope of the disclosure. For example, although the disclosed cart is designed to hold HPP carriers, it is also well suited to holding other objects, and modifications to accommodate other objects are contemplated.

What is claimed is:

1. An apparatus for supporting a plurality of objects, the apparatus comprising:
   a frame; and
   a drum rotatably attached to the frame so that the drum is rotatable about a horizontal axis, the drum having first and second ends spaced axially apart, the drum comprising a plurality of first circular openings in the first end and a plurality of second circular openings in the second end, and the drum comprising plurality of bays, wherein each bay:
   is defined by a cylindrical space between one of the first circular openings and one of the second circular openings, the cylindrical space having a longitudinal axis;
   is configured to receive one or more objects through its first circular opening; and
   comprises two roller guides, each roller guide having a plurality of rollers disposed thereon, wherein the rollers are positioned so that their rolling surfaces are substantially tangent to the cylindrical space, and wherein the two roller guides of a bay are positioned at an angular rotational offset about the longitudinal axis with respect to the two roller guides of an adjacent bay.

2. The apparatus of claim 1 wherein the horizontal axis is defined by a longitudinal axial shaft.

3. The apparatus of claim 1 further comprising a shield positioned to prevent the one or more objects received within the respective bay from falling out of the respective bay as the drum rotates about the horizontal axis.

4. The apparatus of claim 1 further comprising a guard that obstructs at least some of the plurality of first circular openings and wherein the guard does not obstruct at least one of the plurality of first circular openings.

5. The apparatus of claim 4 wherein the guard is substantially circular with a concave portion.

6. The apparatus of claim 1 further comprising a housing that obstructs at least some of the plurality of first circular openings and wherein the housing has a movable panel that selectively obstructs at least one of the plurality of first circular openings.

7. The apparatus of claim 1 further comprising a pneumatic rotational mechanism.

8. The apparatus of claim 7 wherein the pneumatic rotational mechanism comprises a helical worm gear having a locking capability.

9. The apparatus of claim 1 wherein the plurality of bays are positioned equidistantly around the horizontal axis.

10. A method of using a cart for supporting a plurality of objects, the cart comprising:
    a frame; and
    a drum rotatably attached to the frame so that the drum is rotatable about a horizontal axis, the drum having first and second ends spaced axially apart, the drum comprising a plurality of first circular openings in the first end and a plurality of second circular openings in the second end, and the drum comprising a plurality of bays, wherein each bay:
- is defined by a cylindrical space between one of the first circular openings and one of the second circular openings, the cylindrical space having a longitudinal axis;
- is configured to receive one or more objects through its first circular opening; and
- comprises two roller guides, each roller guide having a plurality of rollers disposed thereon, wherein the rollers are positioned so that their rolling surfaces are substantially tangent to the cylindrical space, and wherein the two roller guides of a bay are positioned at an angular rotational offset about the longitudinal axis with respect to the two roller guides of an adjacent bay;

the method comprising:
- sliding a first object onto the two roller guides of a first bay of the plurality of bays, the first bay being at a first position;
- rotating the drum about the horizontal axis to move a second bay of the plurality of bays to the first position; and
- sliding a second object onto the two roller guides of the second bay.

11. The method of claim 10 further comprising inserting a third object into the first bay before rotating the drum.

12. The method of claim 10 wherein rotating the drum comprises moving a joystick.

13. The method of claim 10 further comprising positioning the cart by moving a caster of the cart into a guide track.

14. The method of claim 10 wherein sliding the first object onto the two roller guides of the first bay comprises sliding the first object through one of the plurality of first circular openings.

* * * * *